United States Patent
Imai et al.

(10) Patent No.: US 7,031,815 B2
(45) Date of Patent: Apr. 18, 2006

(54) COLLISION TYPE IDENTIFYING DEVICE

(75) Inventors: Katsuji Imai, Nagoya (JP); Motomi Iyoda, Seto (JP); Masuji Oshima, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 133 days.

(21) Appl. No.: 10/488,000

(22) PCT Filed: Sep. 18, 2002

(86) PCT No.: PCT/IB02/03830

§ 371 (c)(1),
(2), (4) Date: Feb. 27, 2004

(87) PCT Pub. No.: WO03/024750

PCT Pub. Date: Mar. 27, 2003

(65) Prior Publication Data

US 2004/0201275 A1    Oct. 14, 2004

(30) Foreign Application Priority Data

Sep. 19, 2001  (JP) ............................. 2001-285707

(51) Int. Cl.
B60R 21/32 (2006.01)

(52) U.S. Cl. .................... 701/46; 701/45; 340/436; 307/10.1; 280/735; 180/282

(58) Field of Classification Search ............ 701/45–47; 340/436; 307/10.1; 280/735; 180/271, 180/282

See application file for complete search history.

(56) References Cited

U.S. PATENT DOCUMENTS

| | | | | |
|---|---|---|---|---|
| 5,189,311 A | * | 2/1993 | Moriyama et al. | 307/10.1 |
| 5,396,424 A | * | 3/1995 | Moriyama et al. | 701/46 |
| 5,777,225 A | * | 7/1998 | Sada et al. | 73/488 |
| 5,883,442 A |   | 3/1999 | Saito | 307/10.1 |
| 6,167,335 A |   | 12/2000 | Ide et al. | 701/45 |
| 6,181,998 B1 | * | 1/2001 | Kanameda et al. | 701/45 |
| 6,330,500 B1 | * | 12/2001 | Moriyama et al. | 701/45 |
| 6,438,475 B1 | * | 8/2002 | Gioutsos et al. | 701/45 |
| 6,502,026 B1 | * | 12/2002 | Kanameda | 701/45 |
| 6,725,141 B1 | * | 4/2004 | Roelleke | 701/45 |

(Continued)

FOREIGN PATENT DOCUMENTS

EP    0 727 336    8/1996

(Continued)

Primary Examiner—Gary Chin
(74) Attorney, Agent, or Firm—Kenyon & Kenyon LLP

(57) ABSTRACT

A collision type identifying device is disposed in a central portion of a vehicle main body and has first deceleration detecting device (22), peak time detecting device (32), required time detecting device (34), and type identifying device (36). The deceleration detecting device (22) detects a vehicle deceleration in the longitudinal direction. The peak time detecting device (32) detects, as a first peak time (tp), a time from the excess of a preset threshold (GTH) by a waveform of the vehicle deceleration (G) detected by the deceleration detecting device (22) to a first peak. The required time detecting device (34) detects, as a required time (tn), a time when an integrated deceleration (VG) obtained through time quadrature of the vehicle deceleration (G) becomes equal to a predetermined integrated value set in advance. The type identifying device (36; 78) identifies a vehicle collision type on the basis of the first peak time (tp) and the required time (tn). The collision type identifying device can identify a vehicle collision as one of a plurality of collision types at once.

10 Claims, 15 Drawing Sheets

U.S. PATENT DOCUMENTS 6,748,307 B1 * 6/2004 Sala et al. .................... 701/46
6,756,889 B1 * 6/2004 Sala et al. .................. 340/436

FOREIGN PATENT DOCUMENTS

| JP | 11-286257 | 10/1999 |
| JP | 2000-219098 | 8/2000 |
| JP | 2001-030873 | 2/2001 |
| JP | 2002-120689 | 4/2002 |
| JP | 2002-178872 | 6/2002 |
| WO | WO 99/20491 | 4/1999 |

* cited by examiner

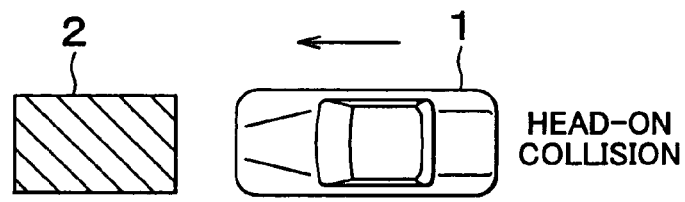
FIG. 1A — HEAD-ON COLLISION
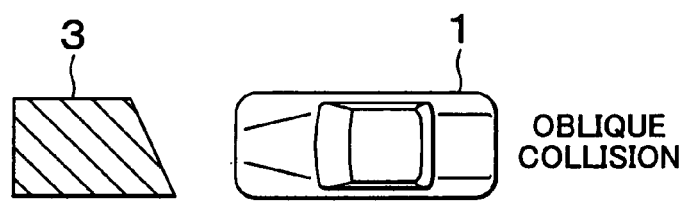
FIG. 1B — OBLIQUE COLLISION
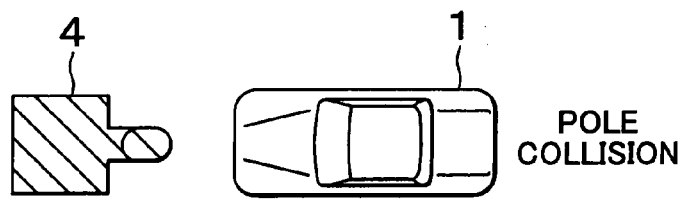
FIG. 1C — POLE COLLISION
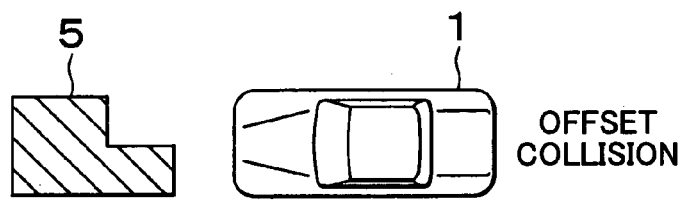
FIG. 1D — OFFSET COLLISION

FIG. 6
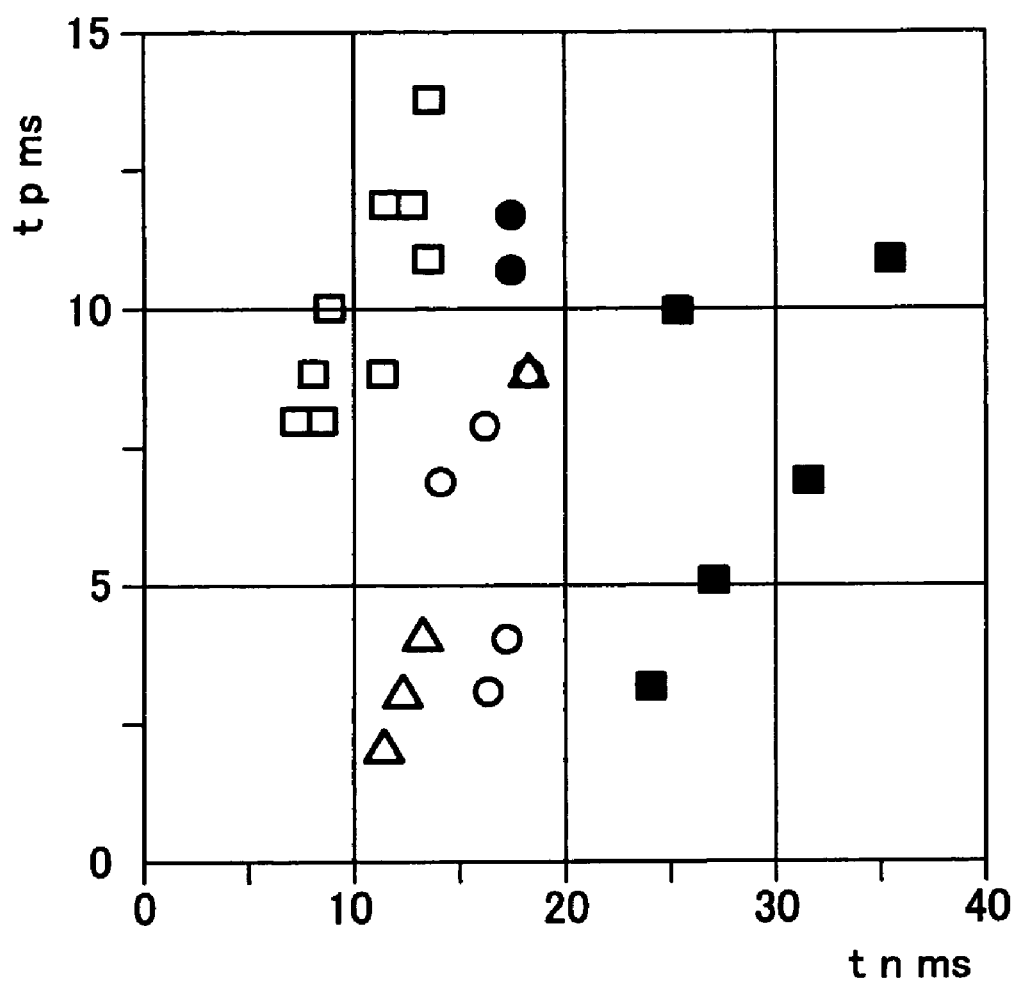
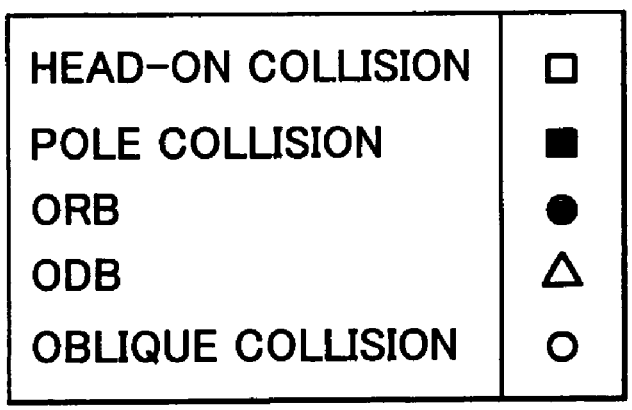

COLLISION TYPE IDENTIFYING DEVICE

BACKGROUND OF THE INVENTION

1. Field of the Invention

The invention relates to a collision type identifying device used in activating a passenger protection system of a vehicle.

2. Description of the Related Art

According to the related art, a passenger protection system such as an air bag system installed in a vehicle is designed such that the timing for activation, the deployment output of an inflator, or the like is adjusted on the basis of time-based changes in the deceleration detected by a deceleration meter or the like disposed in the vehicle.

It is to be noted, however, that there are various vehicle collision types as shown in FIGS. 1A to 1D. In the case of a head-on collision (A), the front face of a vehicle 1 collides against an object 2. In the case of an oblique collision (B), the vehicle 1 collides against an object 3 at a certain angle. In the case of a pole collision (C), the front center of the vehicle 1 collides against a telegraph pole 4 or the like. In the case of an offset collision (D), one side of the front face of the vehicle 1 collides against an object 5.

While the head-on collision (A) and the pole collision (C) are classified into a laterally symmetrical collision type, the oblique collision (B) and the offset collision (D) are classified into a laterally asymmetrical collision type. The direction, amount, timing, or the like of displacement of passengers in the event of a vehicle collision differs depending on whether the collision is symmetrical or asymmetrical. Furthermore, the offset collision (D) is classified into ORB (Offset Rigid Barrier) and ODB (Offset Deformable Barrier). In the case of ORB, the vehicle 1 collides against a rigid object. In the case of ODB, the vehicle 1 collides against a deformable object. The direction, amount, timing, or the like of displacement of passengers also differs depending on whether the offset collision (D) is ORB or ODB.

Accordingly, there is a limit to the aptness in driving the passenger protection system simply on the basis of time-based deceleration changes occurring in the vehicle. That is, although reliable detection of a vehicle collision type leads to the driving of the passenger protection system at a suitable timing and thus to the protection of passengers, it is difficult to detect a collision type precisely.

To overcome the difficulty, the present applicant proposes devices for identifying a vehicle collision type. In one of them (Japanese Patent Application Laid-Open 2001-30873), deceleration sensors (satellite sensors) are disposed at a plurality of locations in a vehicle in addition to a deceleration sensor (floor sensor) disposed on the center side of a main body of the vehicle. A collision type is identified on the basis of decelerations detected by these sensors and is utilized to control the timing suited to ignite an air bag system or an output state of the air bag. Thus, passengers are protected reliably. If a vehicle is equipped with the device thus constructed, passengers can be protected in accordance with the vehicle collision type and thus more reliably in comparison with the former case.

However, the vehicle deceleration at which the passenger protection system is to be activated in the event of an oblique collision or an ODB collision is often close to the vehicle deceleration at which the passenger protection system is not to be activated in the event of an ORB collision. Similarly, the vehicle deceleration at which the passenger protection system is to be activated in the event of a pole collision is often close to the vehicle deceleration at which the passenger protection system is not to be activated in the event of a head-on collision. In many cases, it is still difficult to identify a vehicle collision type with high precision simply on the basis of a vehicle deceleration.

As shown in FIGS. 1A to 1D, vehicle collision types are classified into symmetrical collision types and asymmetrical collision types. Furthermore, the vehicle may collide against objects with different rigidities. Thus, more precise identification of a collision type inevitably requires a plurality of identification processings.

SUMMARY OF THE INVENTION

The invention has been made in view of the aforementioned circumstances.

A collision type identifying device disposed in a central portion of a vehicle main body is provided. The collision type identifying device includes a first deceleration detector that detects a vehicle deceleration in the longitudinal direction, a peak time detector that detects, as a first peak time tp, a time from the excess of a preset threshold by a waveform of the vehicle deceleration detected by the the first deceleration detector to a first peak, a required time detector that detects, as a required time, a time when an integrated deceleration obtained through time quadrature of the vehicle deceleration becomes equal to a predetermined integrated value and a type identifying device that identifies a vehicle collision type on the basis of a collision type identifying map which is formed of the first peak time and the required time.

The aforementioned collision type identifying device can identify a vehicle collision type as one of the aforementioned various collision types at once by using the collision type identifying map which is formed of the first peak and the required time, which are calculated in respect of the waveform of the vehicle deceleration that is detected periodically.

Further, the vehicle collision type can be identified on the basis of the single vehicle deceleration detected by the first deceleration detector disposed in the central portion of the vehicle main body. Thus, the overall structure can be simplified.

If the vehicle deceleration is not on a level indicating a collision of the vehicle, it is excluded from consideration by providing the threshold. The emersion of the first peak in the vehicle deceleration waveform is confirmed on this premise. Therefore, the collision type can be identified in the early stages, namely, in an initial collision phase of the vehicle.

BRIEF DESCRIPTION OF THE DRAWINGS

The above and other objects, features, advantages, and technical and industrial significance of this invention will be better understood by reading the following detailed description of exemplary embodiments of the invention, when considered in connection with the accompanying drawings, in which:

FIGS. 1A to 1D show examples of vehicle collision types;

FIG. 6 shows how a first peak time tp and a required time tn are related to each other in respect of data obtained by a vehicle collision test;

DETAILED DESCRIPTION OF EXEMPLARY EMBODIMENTS

Description of the Exemplary Embodiments

In the following description and the accompanying drawings, the invention will be described in more detail in terms of exemplary embodiments.

Two embodiments of the invention will be described hereinafter with reference to the drawings.

The first embodiment handles a collision type identifying device that identifies a vehicle collision type on the basis of a vehicle deceleration (hereinafter referred to as floor G) obtained from a floor sensor disposed in a floor tunnel or the like in a central portion of a vehicle main body.

The second embodiment handles a collision type identifying device that identifies a vehicle type using first and second vehicle decelerations. The first vehicle deceleration is a vehicle deceleration (floor G) obtained from the aforementioned floor sensor. The second vehicle decelerations are a left-side vehicle deceleration (hereinafter referred to as front LG) obtained from a front-left sensor that is disposed on the left side and in front of the floor sensor and a right-side vehicle deceleration (hereinafter referred to as front RG) obtained from a front-right sensor that is disposed on the right side and in front of the floor sensor.

The first embodiment and the second embodiment will be described hereinafter in this order.

First Embodiment

Figure 2:
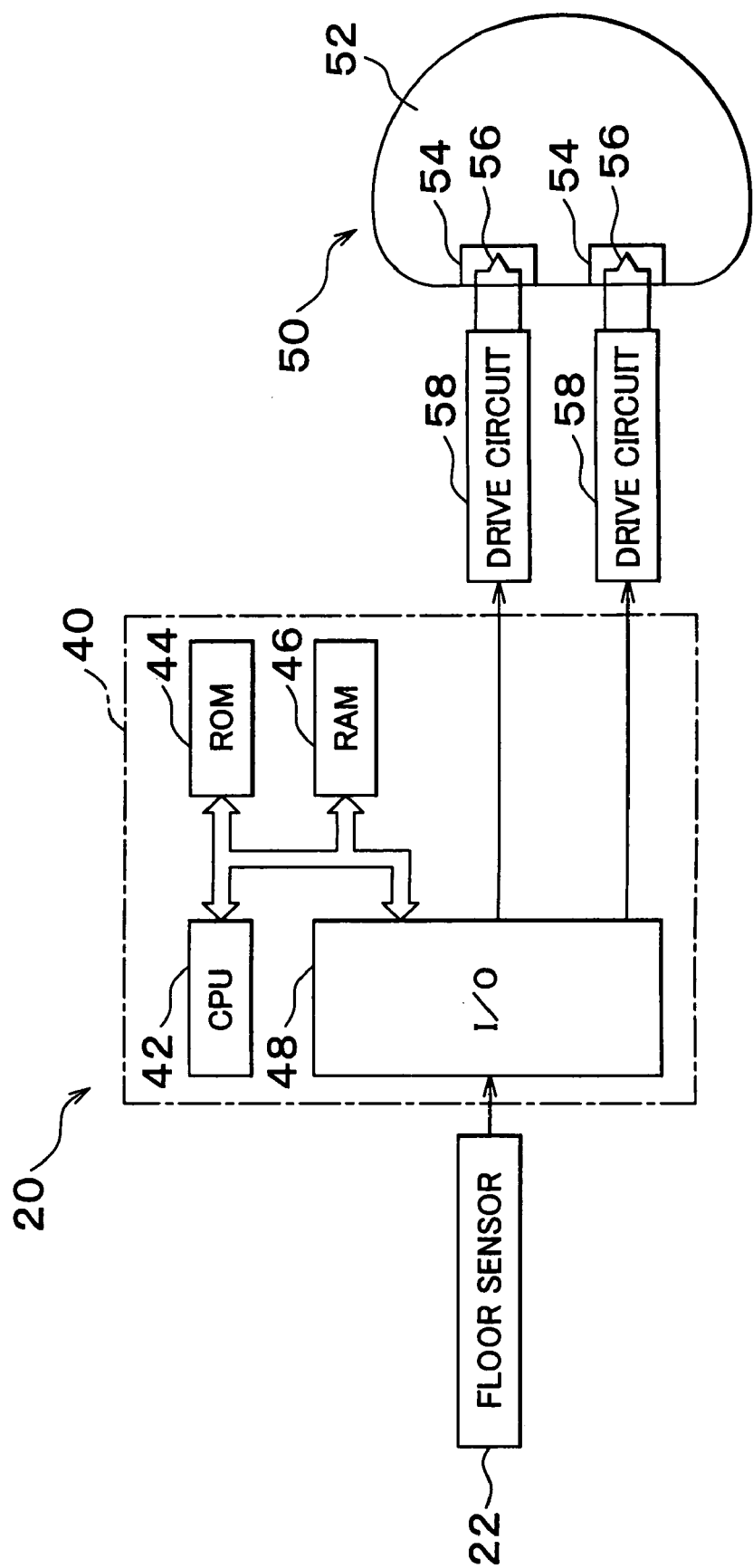
FIG. 2 shows the hardware structure of a collision type identifying device according to a first embodiment of the invention.
Figure 3:
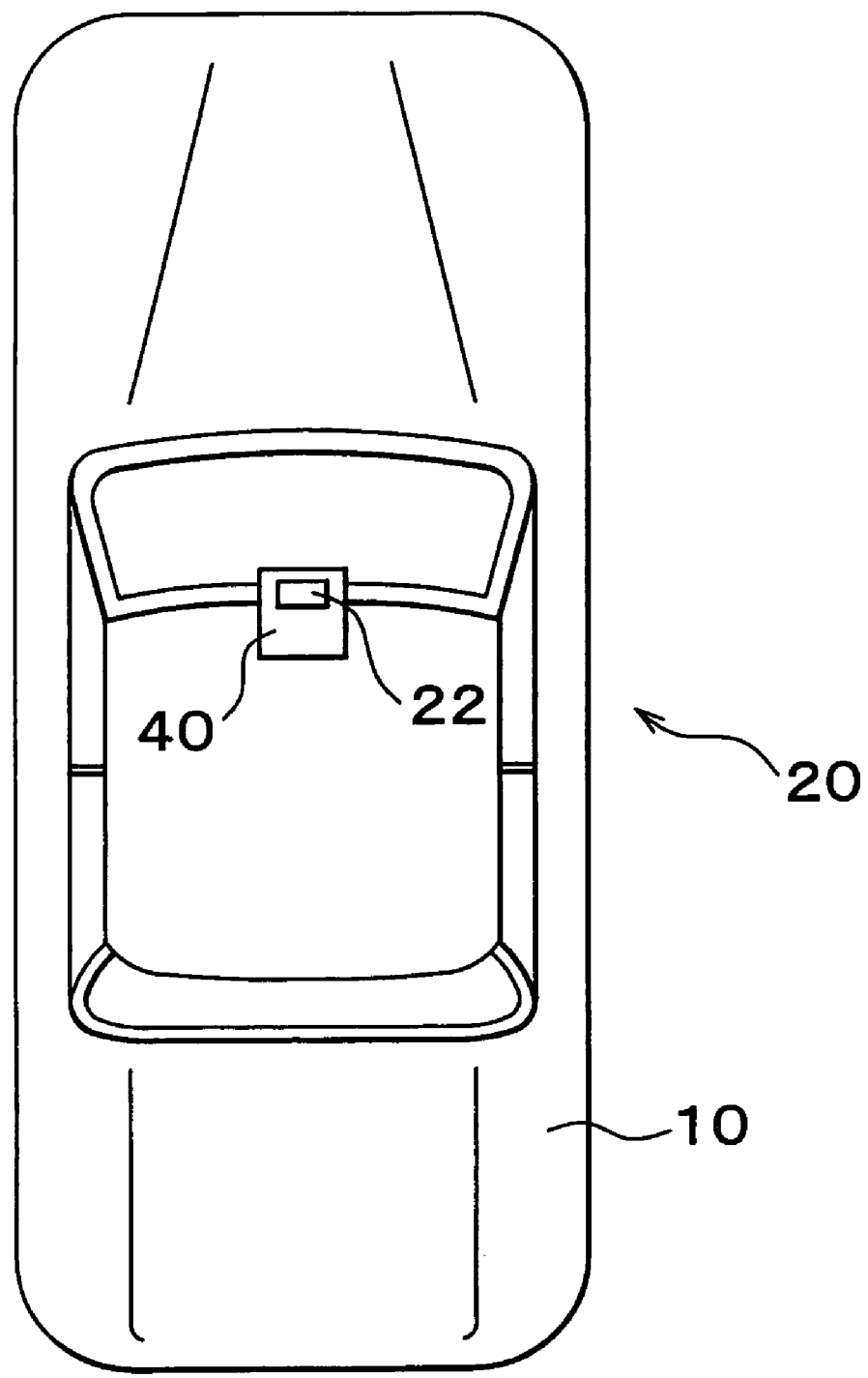
FIG. 3 is an exemplary view showing how the collision type identifying device shown in FIG. 2 is installed in a vehicle.
Figure 4:
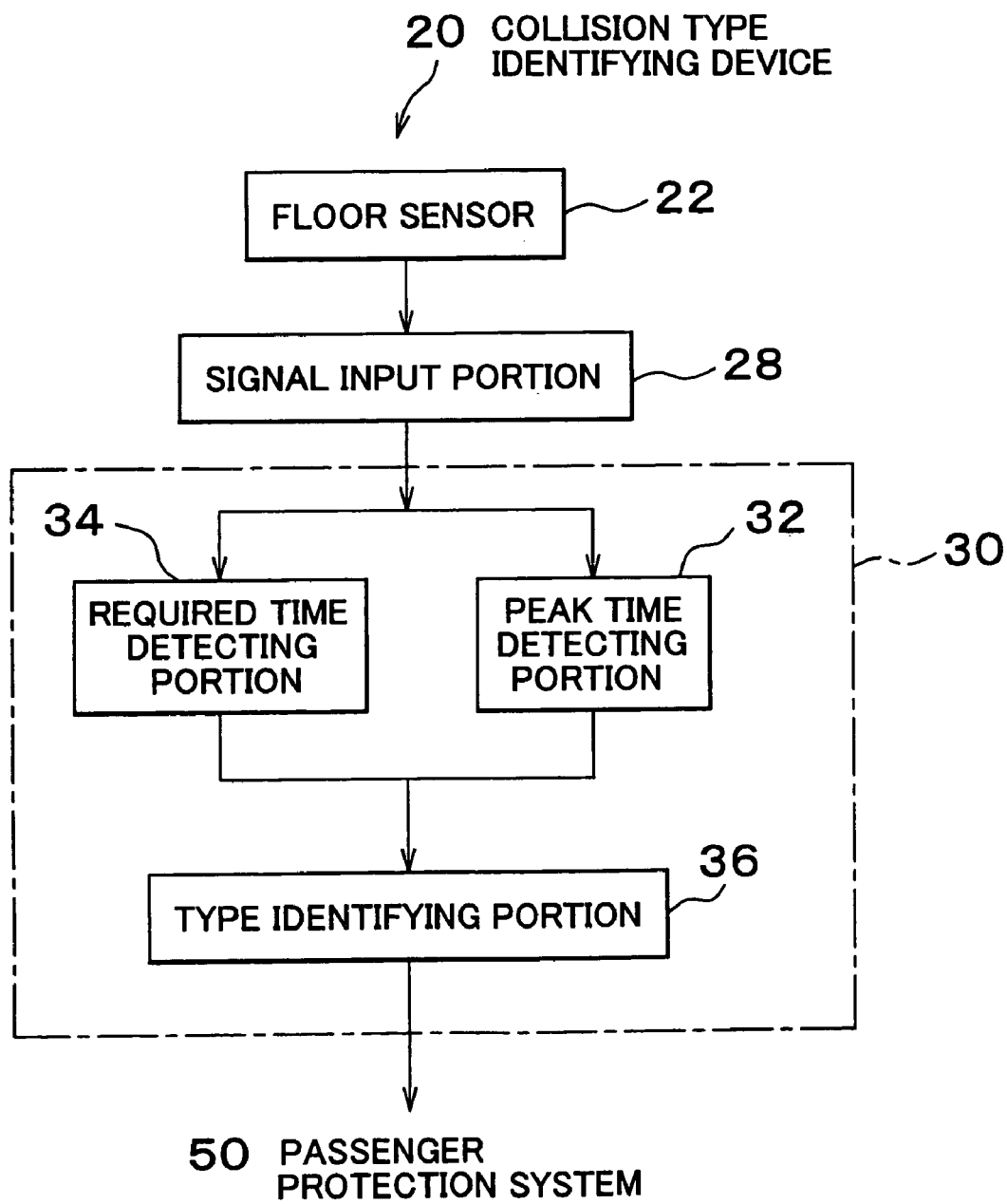
FIG. 4 is a functional block diagram of the overall structure of the collision type identifying device shown in FIG. 2.

FIG. 2 shows the hardware structure of a collision type identifying device 20 according to the first embodiment. FIG. 3 is an exemplary view showing how the collision type identifying device 20 is installed in a vehicle 10. FIG. 4 is a functional block diagram of the overall structure of the collision type identifying device 20. It is to be noted herein that FIG. 2 shows, as an example, an air bag system 50 that is driven on the basis of a result obtained from the collision type identifying device 20.

As shown in FIGS. 2 and 3, a main body of the collision type identifying device 20 of this embodiment is disposed in a floor tunnel close to a console in a central portion of the vehicle 10, and includes, as a component thereof, a floor sensor 22 for detecting a floor G in the longitudinal direction of the vehicle.

The collision type identifying device 20 includes a microcomputer 40 that identifies a collision type of the vehicle 10 on the basis of a waveform of the floor G that is detected by the floor sensor 22 periodically. The microcomputer 40 is constructed mainly of a CPU 42 and includes a ROM 44 for storing predetermined processing programs, a RAM 46 for temporarily storing data, an I/O circuit 48, and the like.

The CPU 42 is so set as to monitor the floor G constantly and continuously at intervals of a predetermined period (e.g. 2 KHz) after a starting timing, which follows the turn-on of an ignition (IG) switch of the vehicle, depression of an accelerator pedal, or the like. Furthermore, the CPU 42 realizes a collision type identifying portion 30. If the vehicle 10 collides, the collision type identifying portion 30 identifies the collision type as head-on collision, oblique collision, ORB, ODB, or pole collision, using the floor G. The functional block diagram of the collision type identifying device 20 shown in FIG. 4 clarifies the structure of the CPU 42.

In FIG. 4, the floor G that is detected by the floor sensor 22 periodically is supplied to the collision type identifying portion 30 via a signal input portion 28. The collision type identifying portion 30 includes a peak time detecting portion 32, a required time detecting portion 34, and a type identifying portion 36. The peak time detecting portion 32 confirms the emersion of a first peak in the deceleration waveform of the floor G and detects a first peak time tp. The required time detecting portion 34 detects, as a required time tn, a time when an integrated deceleration VG obtained by time quadrature (or called time integration) of the floor G becomes equal to a required integrated value set in advance.

The peak time detecting portion 32 confirms the emersion of the first peak in the floor G waveform with the aid of the Wavelet transformation processing, and detects a time of the emersion as a first peak time tp. In this embodiment, the first peak time tp is defined as a time from the excess of a predetermined threshold GTH by the floor G to the emersion of the first peak.

If the first peak emerges in the aforementioned floor G waveform, it is almost certain that the vehicle has collided. In identifying the vehicle collision type, it is effective to confirm the first peak and identify the collision type on the basis of the first peak. If the peak time detecting portion 32 detects the first peak time tp, a detection signal output from the peak time detecting portion 32 is supplied to the type identifying portion 36.

If the vehicle deceleration is not on a level indicating a vehicle collision, it is excluded from consideration by providing the threshold GTH. The emersion of the first peak in the vehicle deceleration waveform is confirmed on this premise. Therefore, the collision type can be determined in the early stages, namely, in an initial collision phase of the vehicle.

Figure 5:
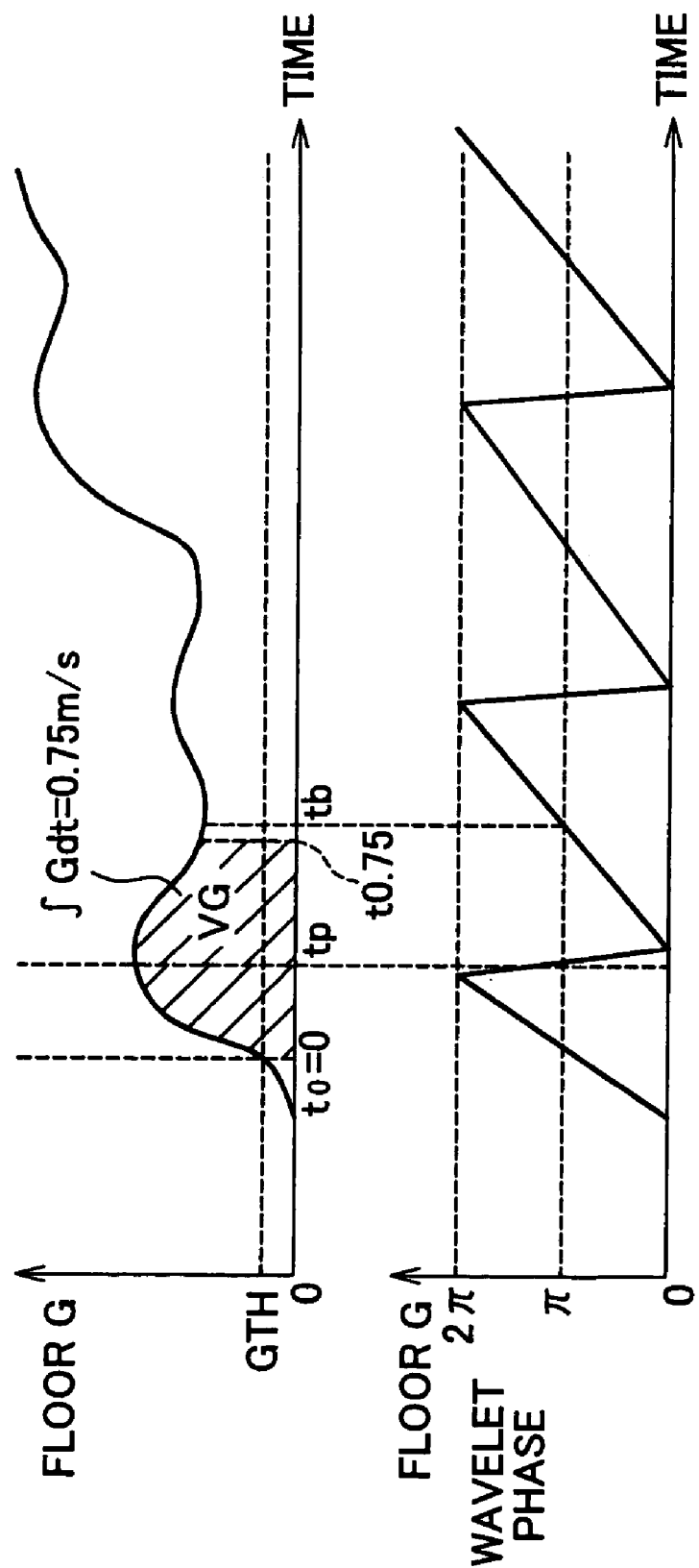
FIG. 5 shows an exemplary floor G waveform that is detected by a floor sensor periodically.

FIG. 5 shows an exemplary floor G waveform that is detected by the floor sensor 22 periodically. The upper stage of FIG. 5 shows the waveform of the floor G, and the lower stage of FIG. 5 shows a Wavelet phase obtained by subjecting the waveform of the floor G to Wavelet transformation.

Referring to the upper stage of FIG. 5, the peak time detecting portion 32 detects the first peak time tp in response to the emersion of the first peak, under the assumption that the floor G exceeds the predetermined threshold GTH at a reference time t0 (=0). It is to be noted in this embodiment that the floor G exceeds the threshold GTH at the time t0 and that the first peak emerges at the time tp. However, since t0=0, it follows that the first peak time=(tp−0). Therefore, the first peak time is described as tp. The Wavelet phase in the lower stage of FIG. 5 is used to detect the aforementioned first peak. This Wavelet processing will be described later in detail.

The required time detecting portion 34 detects, as the required time tn, a time when the integrated deceleration VG ($\int Gdt$) obtained by time quadrature of the floor G becomes equal to the required integrated value set in advance. This required integrated value is set in advance as the predetermined integrated deceleration VG corresponding to a required time, which is a critical value for determining whether to activate a passenger protection system in the event of a vehicle collision.

The required time detecting portion 34 has a function of processing the floor G through integration. As in the case of the peak time detecting portion 32, the required time detecting portion 34 calculates the integrated deceleration VG continuously after the floor G has exceeded the threshold GTH (the time when the floor G exceeds the threshold GTH is the reference time t0). The required time detecting portion 34 detects, as the required time tn, a time when the integrated deceleration VG becomes equal to the aforementioned required integrated value.

The aforementioned required integrated value will now be described. There is a critical time for determining whether to activate a passenger protection system such as an air bag in the event of a collision of the vehicle. In order to protect passengers suitably in the event of a vehicle collision, it must be determined before the critical time whether to activate the passenger protection system. In the present specification, the critical time for this determination is referred to as the required time. As well as the aforementioned first peak, this required time reflects a state in the event of a vehicle collision. Therefore, it is effective to identify the collision type on the basis of the required time.

That is, the aforementioned required time tends to be short in the case of a high-speed head-on collision or the like, and tends to be relatively long in the case of a pole collision. The required time for other collision types such as ORB, ODB, and oblique collision tends to be between the required time for head-on collision and the required time for pole collision. Furthermore, the required time differs among these collision types. Since ORB means a collision against a rigid object, the required time for ORB tends to be close to the required time for head-on collision. Since ODB means a collision against a deformable object, the required time for ODB tends to be close to the required time for pole collision. That is, although there are a plurality of collision types on which the floor G waveform depends, the required time serves as a guideline for identifying the collision type.

If attention is paid to the integrated deceleration VG obtained by time quadrature of the floor G in the upper stage of FIG. 5 from the standpoint as mentioned above, the integrated deceleration VG is represented as an area below the floor G waveform. In the case of a head-on collision, this area is large in its initial stage. On the contrary, in the case of a pole collision, this area is large in its later stage. This embodiment is based on a result of studies that the vehicle collision type is identified effectively by using a time (required time) when the area becomes equal to the predetermined integrated deceleration VG corresponding to the required time constituting the critical time for determining whether to activate the passenger protection system.

For example, the integrated deceleration VG at the required time in the event of a high-speed head-on collision is defined as a required integrated value and used as a criterion in advance. The time when the integrated deceleration VG of the floor G detected periodically from the vehicle that has collided becomes equal to the required integrated value, namely, the required time tn is used to identify the collision type. This required integrated value, which is constant, is reached early in the case of a head-on collision and latest in the case of a pole collision. In the case of an ORB, ODB, or oblique collision, it takes an intermediate period to reach the required integrated value.

The aforementioned required integrated value is obtained, for example, by conducting a test based on a high-speed head-on collision and calculating the integrated deceleration VG corresponding to the required time. The integrated deceleration VG is set in advance as the required integrated value of the vehicle. It is preferable that the required integrated value be set by conducting a collision test and a simulation according to the vehicle type. For example, the required integrated value is 0.7 to 0.8 m/s. In this embodiment, the required integrated value=0.75 m/s.

The required time tn detected by the required time detecting portion 34 is supplied to the type identifying portion 36 as a detection signal.

The type identifying portion 30 uses the required time tn and the first peak time tp obtained from the peak time detecting portion 32 and identifies a vehicle collision as head-on collision, oblique collision, ORB, ODB, or pole collision.

Furthermore, a method that is adopted by the type identifying portion 36 in the first embodiment so as to identify a vehicle collision as one of a plurality of collision types will be described.

FIG. 6 shows how the first peak time tp and the required time tn are related to each other in respect of data obtained by a vehicle collision test. The axis of abscissa represents the required time tn, and the axis of ordinate represents the first peak time tp. In this collision test, the required integrated value is 0.75 m/s. That is, the required time tn is a time when time quadrature of the floor G (m/s$^2$) results in 0.75 m/s.

In FIG. 6, while data regarding head-on collisions tend to gather in the upper-left region, data regarding pole collisions tend to gather in the lower-right region. Data regarding the other collisions are located between the data regarding head-on collisions and the data regarding pole collisions. The first peak time tp for ODB is shorter than the first peak time tp for oblique collisions, which is in turn shorter than the first peak time tp for ORB.

As regards the first peak time tp, the first peak time required by the data regarding head-on collision or ORB is longer than the first peak time required by the data regarding oblique collisions or ODB. This is because the first peak time tp is measured immediately after the threshold GTH has been exceeded. That is, in the case of a head-on or ORB collision, the floor G waveform exceeds the threshold GTH in the initial stage of the collision and then reaches the first peak. However, in the case of an oblique or ORB collision, the floor G waveform does not exceed the threshold GTH immediately in the initial stage of the collision but tends to exceed the threshold GTH in the intermediate to late stage of the collision and to reach the first peak thereafter all of a sudden. Accordingly, the axis of ordinate in FIG. 6 demonstrates that the first peak time tp for head-on or ORB collisions is relatively long.

As is apparent from FIG. 6, it is understandable that a vehicle collision can be identified at once as one of a plurality of collision types if a relation between the required time tn and the first peak time tp of the floor G waveform is used.

The floor sensor 22 is disposed at the center of the vehicle main body and thus detects the floor G stably until a breakage spreading to the vehicle center side is caused. However, according to the related art, the possibilities of employing other sensors accessorily have been considered on the ground that the floor G alone does not allow a certain collision to be identified as one of a plurality of collision types. However, this embodiment allows a certain collision to be identified as one of a plurality of collision types at once by using the required time tn and the first peak time tp of the floor G waveform.

A method in which the peak time detecting portion 32 detects the first peak time of the floor G waveform will now be described with reference to FIGS. 7 and 8.

In this embodiment, the peak time detecting portion 32 subjects the waveform of the floor G supplied via the signal input portion 28 to the Wavelet transformation processing, confirms the emersion of the first peak (first maximum value) of the floor G waveform, and detects the first peak time tp.

While Fourier transformation represents a time series signal as a superposition of constant sinusoidal waves, Wavelet transformation is a method of representing a time series signal as a superposition of temporally localized waves (wavelets). Wavelet transformation is a data conversion method that has recently been applied widely to various fields including the spectral analysis of non-constant signals, speech recognition/synthesis, the compression of image information, noise removal, and the detection of malfunctions.

The peak time detecting portion 32 performs a product-sum operation by using a predetermined complex function as an integration base for an input signal, and calculates a phase θ of the magnitude of a Wavelet transformation value on the basis of a real part P and an imaginary part I thereof. A time corresponding to the first maximum value is detected on the basis of the phase θ thus calculated. Hereinafter, a principle by which the peak time detecting portion 32 detects the first peak by means of the Wavelet transformation method will be described briefly.

A Wavelet transformation coefficient (a, b) of a time series signal X(t) is developed as exemplified in an equation (2), which has a pair of similar functions ψa, b(t) as base functions. The pair of the similar functions ψa, b(t) is obtained by preparing a base Wavelet function ψ(t) that is localized both temporally and frequency-wise, subjecting it to "a"-time scale transformation as indicated by an equation (1), and then subjecting it to shift transformation (translation) by an origin "b". It is to be noted herein that a scale transformation parameter "a" is inversely proportional to a transformation frequency "f".

$$\psi a, b(t) = a^{-1/2} \psi((t-b)/a) \quad (1)$$

$$X(a, b) = \int X(t) \psi a, b(t) \quad (2)$$

In this embodiment, a Gabor function expressed by an equation (3) is used as the base Wavelet function ψ(t). The Gabor function is a complex function in which the imaginary part I is different in phase by π/2 from the real part R. It is to be noted herein that $\Omega_0$ in the equation (3) is a constant determined by the frequency "f" ($\omega_0=2\pi f$) and that α is a constant as well.

$$\psi(t) = \exp(-\alpha t^2 + i\omega_0 t) \quad (3)$$
$$= \{\exp(-\alpha t^2)\} \times \{\cos(\omega_0 t) + i\sin(\omega_0 t)\}$$

Figure 7:
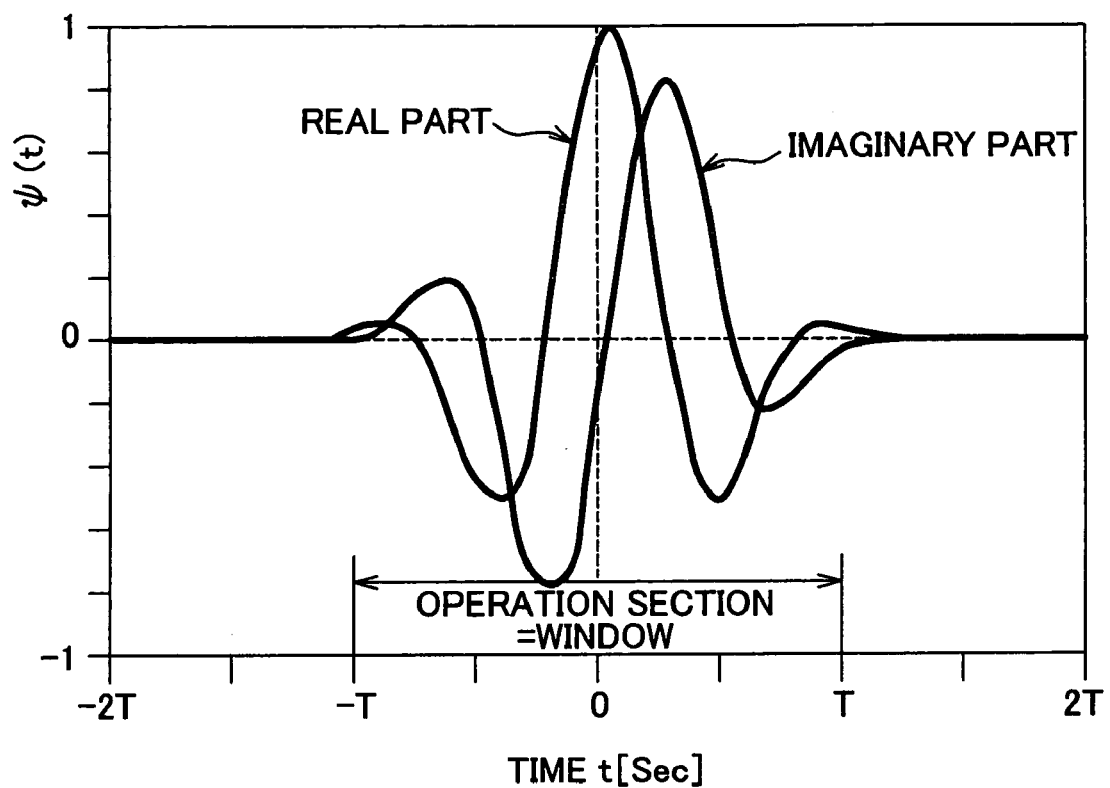
FIG. 7 is an explanatory view exemplifying the representation of a Gabor function along a time axis.
Figure 8:
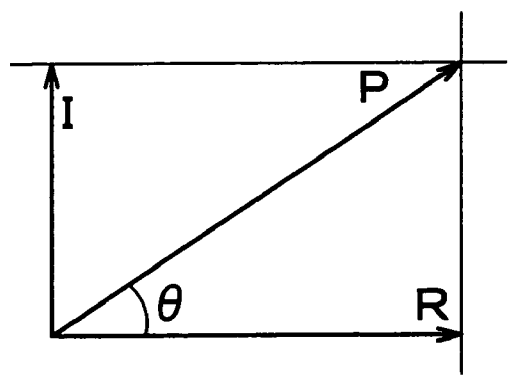
FIG. 8 is an explanatory view showing how a real part R, an imaginary part I, a magnitude p, and a phase θ of Wavelet transformation X(a, b) are related to one another.

FIG. 7 shows the representation of the Gabor function along a time axis in the case where α=π in the equation (3). As shown in FIG. 7, the Gabor function is localized in a range of −T to T along the time axis, and the real part waveform and the imaginary part waveform are different in phase by π/2. More concretely, Wavelet transformation for the time series signal X(t) is a product-sum operation of the time series signal X(t) and a function having the suitably selected scale transformation parameter "a" ($\omega_0$ in the equation (3)). The operation section is confined to a range with localized waveforms (in the range of −T to T in FIG. 7). This range is referred to as a window.

Because the Gabor function is a complex function, Wavelet transformation X(a, b) of the time series signal X(t) based on the Gabor function is represented as a complex number. FIG. 8 shows a relation among the real part R, the imaginary part I, the magnitude P, and the phase θ of Wavelet transformation X(a, b). The magnitude P is calculated according to an equation (4), and the phase θ is obtained from an equation (5). It is to be noted herein that the magnitude P means a logical magnitude of Wavelet transformation X(a, b) and is a dimensionless quantity. The phase θ changes within the range of 0 to 2π depending on the magnitudes and signs of the real part R and the imaginary part I.

$$P = (R^2 + I^2)^{1/2} \quad (4)$$

$$\theta = \tan^{-1}(I/R) \quad (5)$$

The phase θ(t) of the transformation frequency "f" close to the frequency of the time series signal X(t) changes from 2π to 0 when the time series signal X(t) has a maximum (peak) amplitude. The phase θ(t) becomes equal to π when the time series signal X(t) has a minimum (bottom) amplitude.

The peak time detecting portion 32 of this embodiment detects a time tp corresponding to the first emersion of the first peak (first maximum value). If one further waits until a time tb corresponding to the first emersion of the first bottom (first minimum value) is detected, the emersion of the first peak can be confirmed more reliably.

That is, if it is confirmed that the phase θ first exceeds π and then drops below π, it is concluded that the phase θ has shifted from 2π to 0. Thus, the time tp corresponding to the first peak is detected indirectly. The first bottom emerges at a time when the phase θ becomes equal to π subsequently.

The aforementioned lower stage of FIG. 5 shows a Wavelet phase waveform, which is obtained by subjecting the floor G waveform detected by the floor G sensor 22 as shown in the upper stage of FIG. 5 to the Wavelet transformation processing. By using the Wavelet transformation method as described above, the first peak is detected at the time tp when the phase θ is inverted from 2π to 0. The first bottom emerges at the time tb when the phase θ exceeds π.

Figure 9:
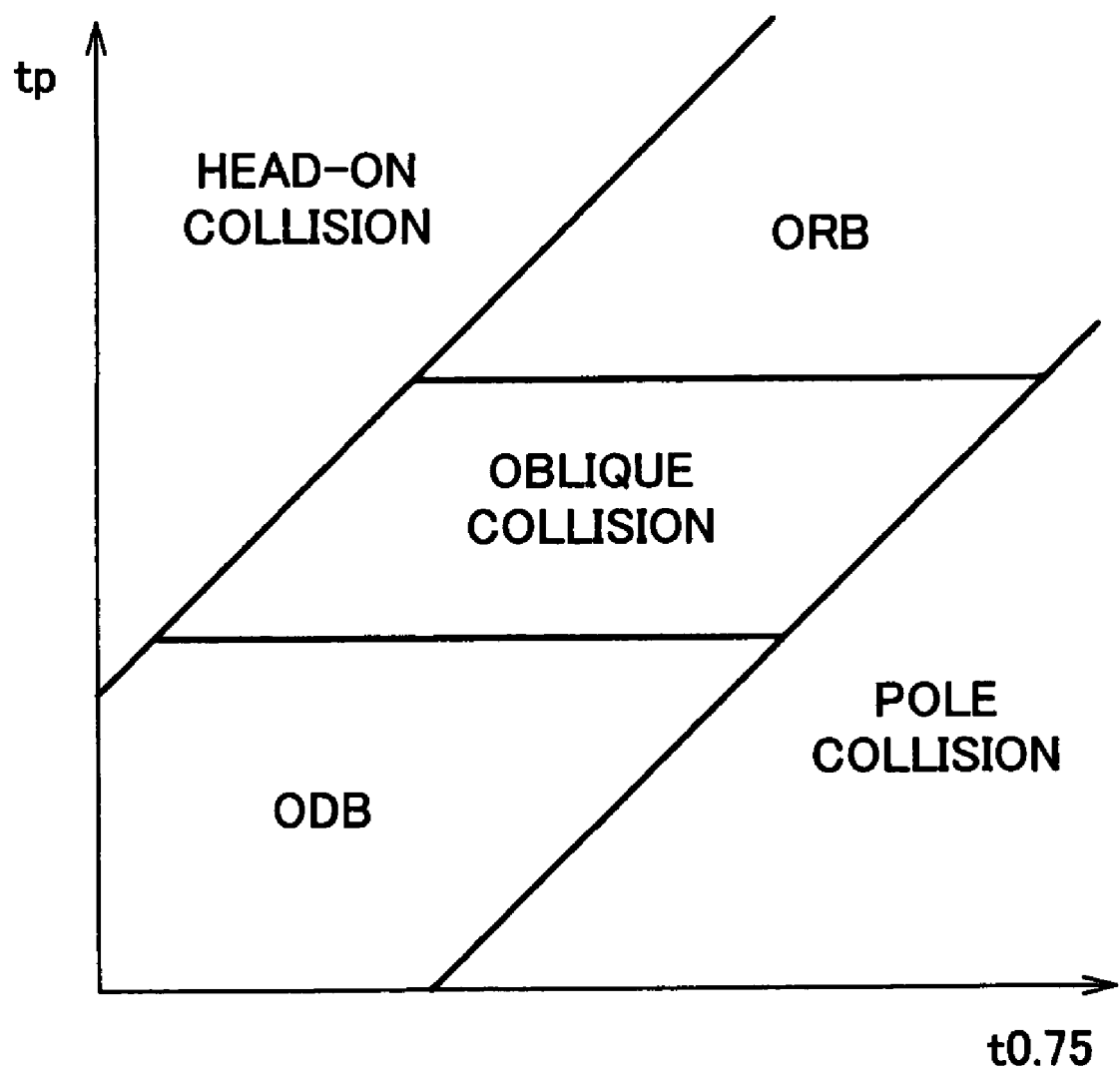
FIG. 9 is an exemplary view of a type identifying map employed in a type identifying portion according to the first embodiment of the invention.

Referring again to FIG. 4, as described above, the peak detecting portion 32 detects the first peak time tp of the floor G waveform and supplies it to the type identifying portion 36, and the required time detecting portion 34 detects the required time tn and supplies it to the type identifying portion 36. The type identifying portion 36 identifies a collision type by means of a type identifying map shown in FIG. 9. As shown in FIG. 9, identification areas for prediction of respective collision types are set in this type identifying map. A collision type can be identified easily by confirming to which one of the identification areas a point that is determined specifically upon detection of the first peak time tp and the required time tn belongs. It is to be noted in this embodiment that the required integrated value is 0.75 m/s and that the required time tn is represented as t0.75 in FIG. 9. In consideration of the aforementioned relation shown in FIG. 6, the type identifying map shown in FIG. 9 is set suitably by referring to collision data or the like according to the vehicle type. This type identifying map is stored in advance in the ROM 44 or the like in the microcomputer 40.

Figure 10:
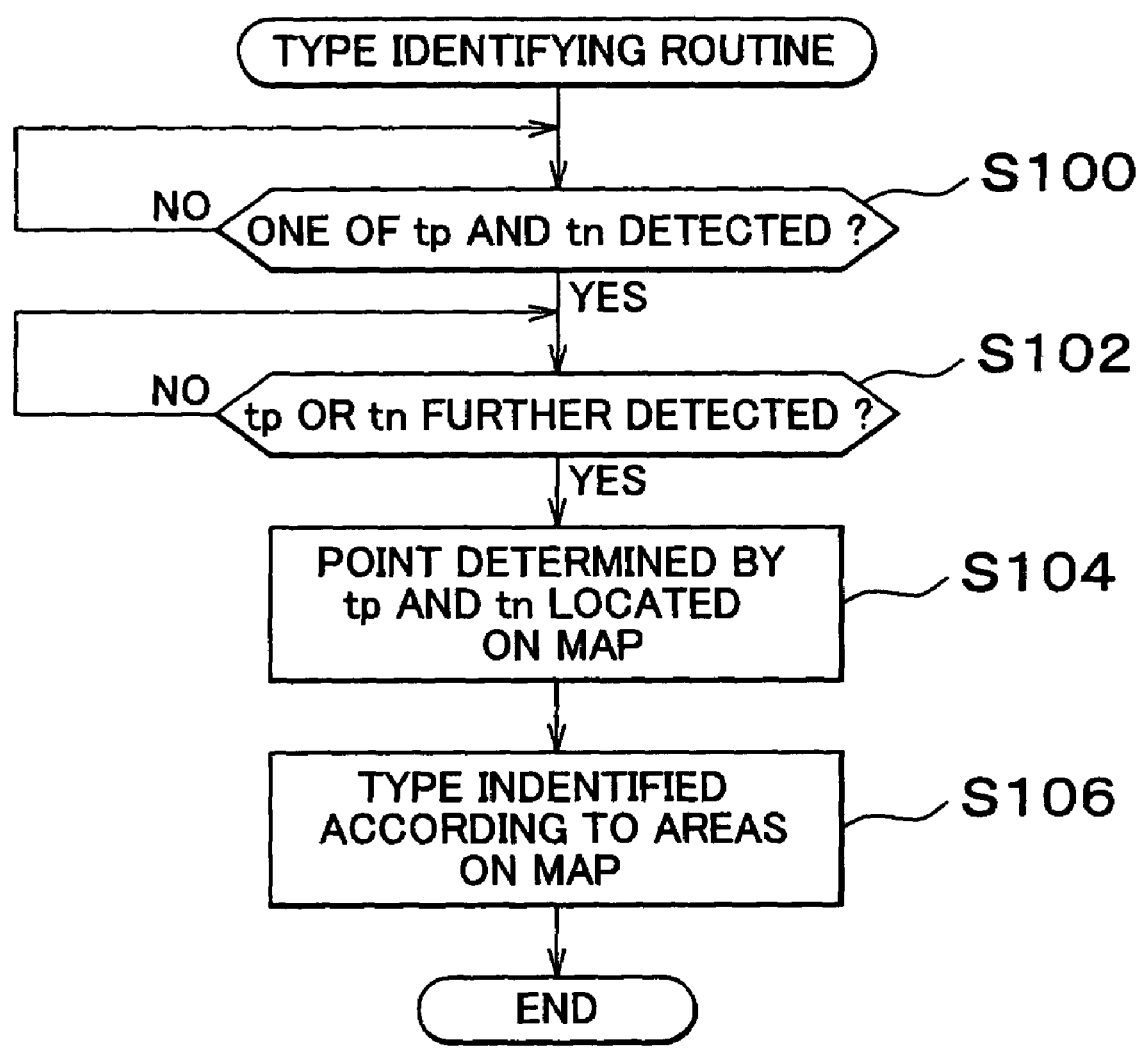
FIG. 10 shows an exemplary identification routine that is executed by the type identifying portion of the collision type identifying device according to the first embodiment of the invention.

FIG. 10 shows an exemplary identification routine that is executed by the type identifying portion 36, which is realized by the CPU 42 of the collision type identifying device 20.

Referring to FIG. 10, if one of the first peak time tp and the required time tn is detected, the type identifying portion 36 prepares for the identification of a collision type (S100). Furthermore, if the remaining one of the first peak time tp and the required time tn is detected (S102), the type identification processing is performed by means of the type identifying map.

A specific point determined by the detected first peak time tp and the required time tn is then located on the type identifying map in step S104. It is then confirmed to which one of the identification areas set in advance according to the collision type this specific point belongs, and the collision type is identified (S106). The processings of the present routine are then terminated.

A result obtained from the type identification based on the present routine is used to perform activation control of the passenger protection system 50 shown in FIG. 2. The air bag system 50 shown in FIG. 2 will now be described briefly. The air bag system 50 includes an air bag 52, two inflators 54, 54 for supplying gas to the air bag 52, ignition devices 56, 56 for igniting a gas generator (not shown), and drive circuits 58, 58 for energizing and igniting the ignition devices 56, 56 on the basis of an activation signal output from the microcomputer 40. The two inflators 54 are provided because two cases are taken into account. In one of the cases, that is, in the case of high output, the two inflators 54 are operated simultaneously so as to deploy the air bag 52 at a high speed. In the other case, that is, in the case of low output, the two inflators 54 are operated with a time difference. Depending on the vehicle collision type, it is determined whether to select high output or low output.

As described above, the collision type identifying device 20 of the first embodiment can identify a collision of the vehicle 10 as one of a plurality of collision types at once by using the required time tn and the first peak time tp of the floor G waveform detected by the peak time detecting portion 32. In particular, it has been believed according to the related art that the identification of a vehicle collision type from the floor G is difficult. However, this embodiment makes it possible to identify from the floor G the type of a collision in which the vehicle is involved. If the collision type identifying device 20 constructed as described above is applied to a passenger protection system such as an air bag system, passengers can be protected reliably.

Second Embodiment

Figure 11:
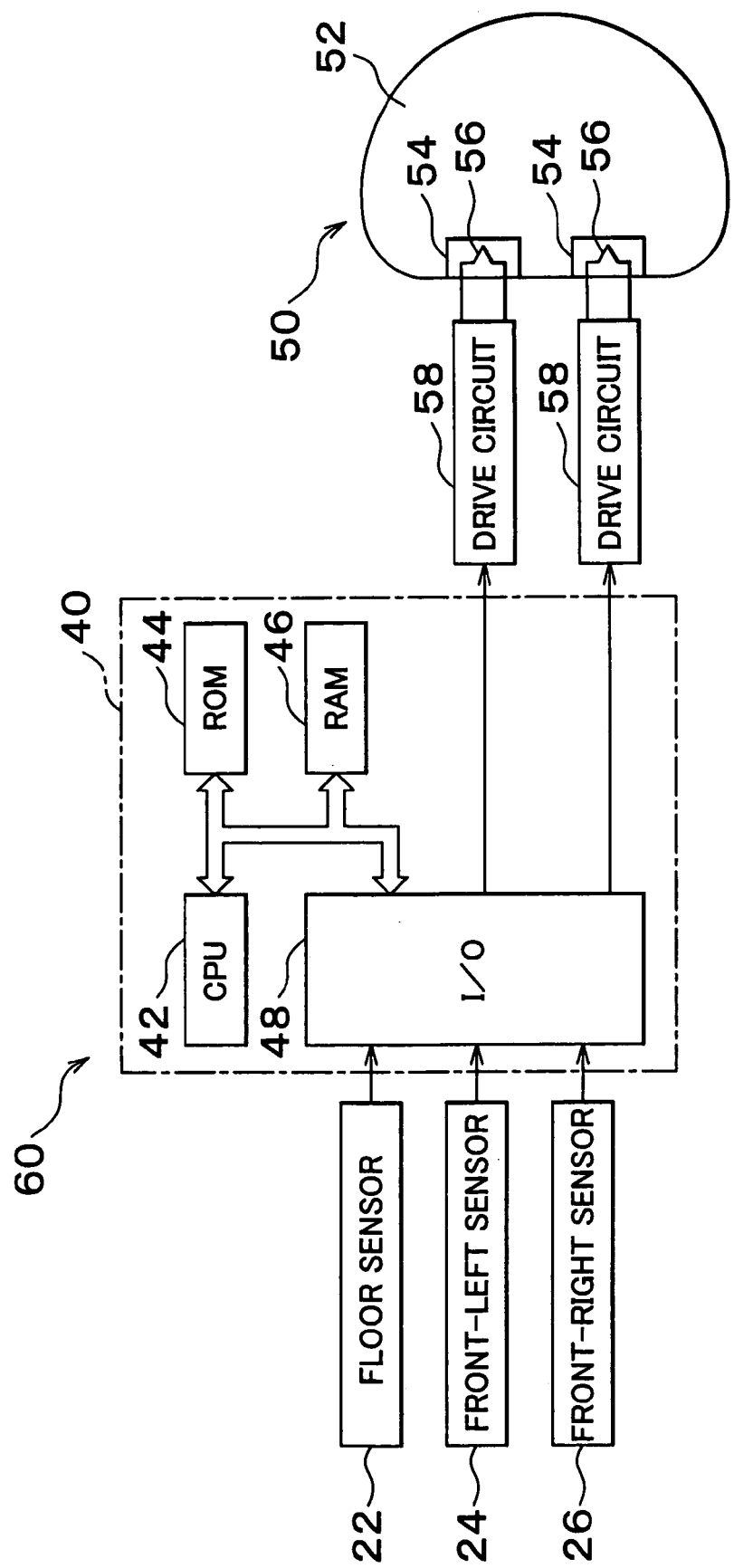
FIG. 11 shows the hardware structure of a collision type identifying device according to a second embodiment of the invention.
Figure 12:
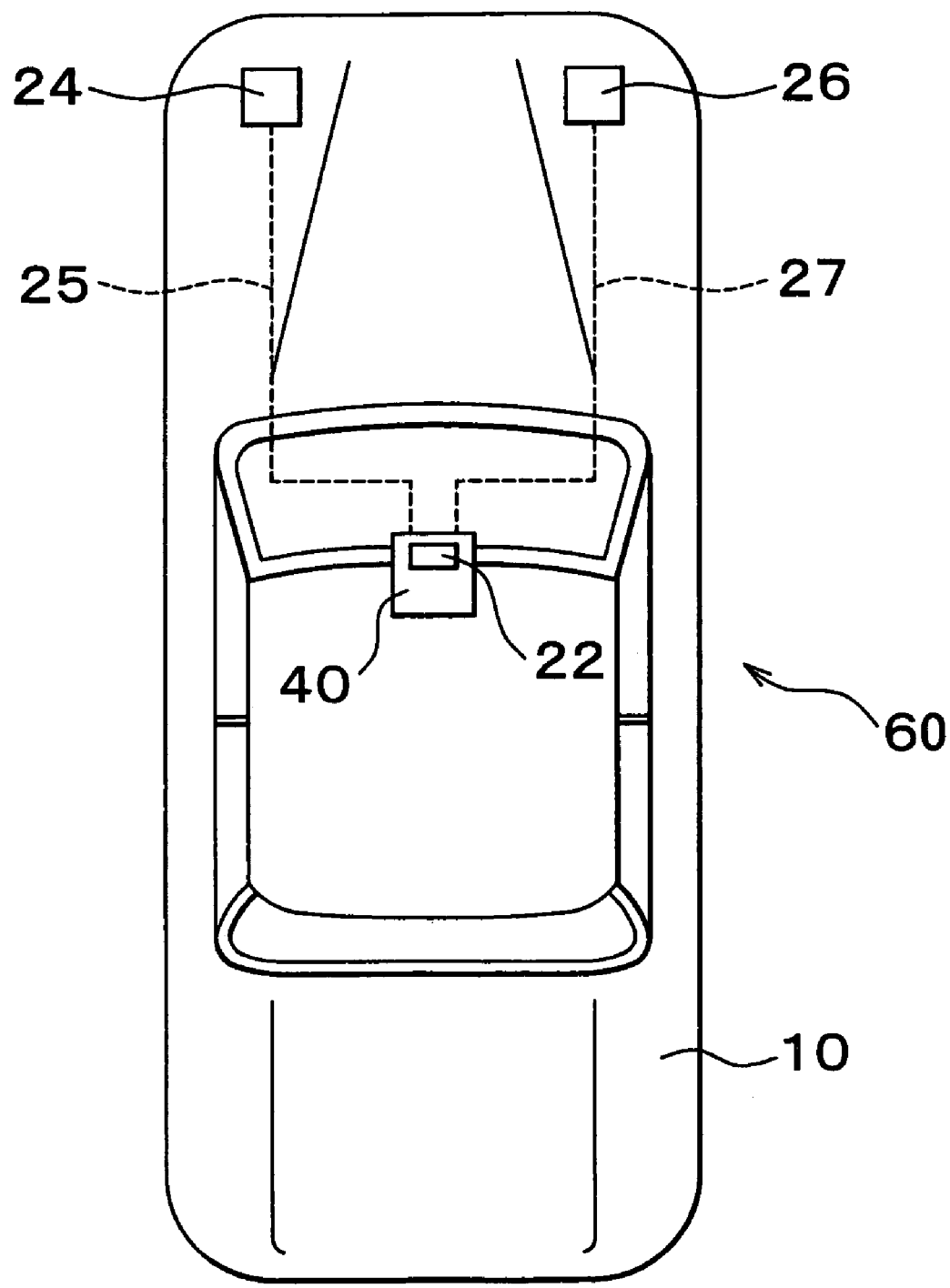
FIG. 12 is an exemplary view showing how the collision type identifying device shown in FIG. 11 is installed in the vehicle.
Figure 13:
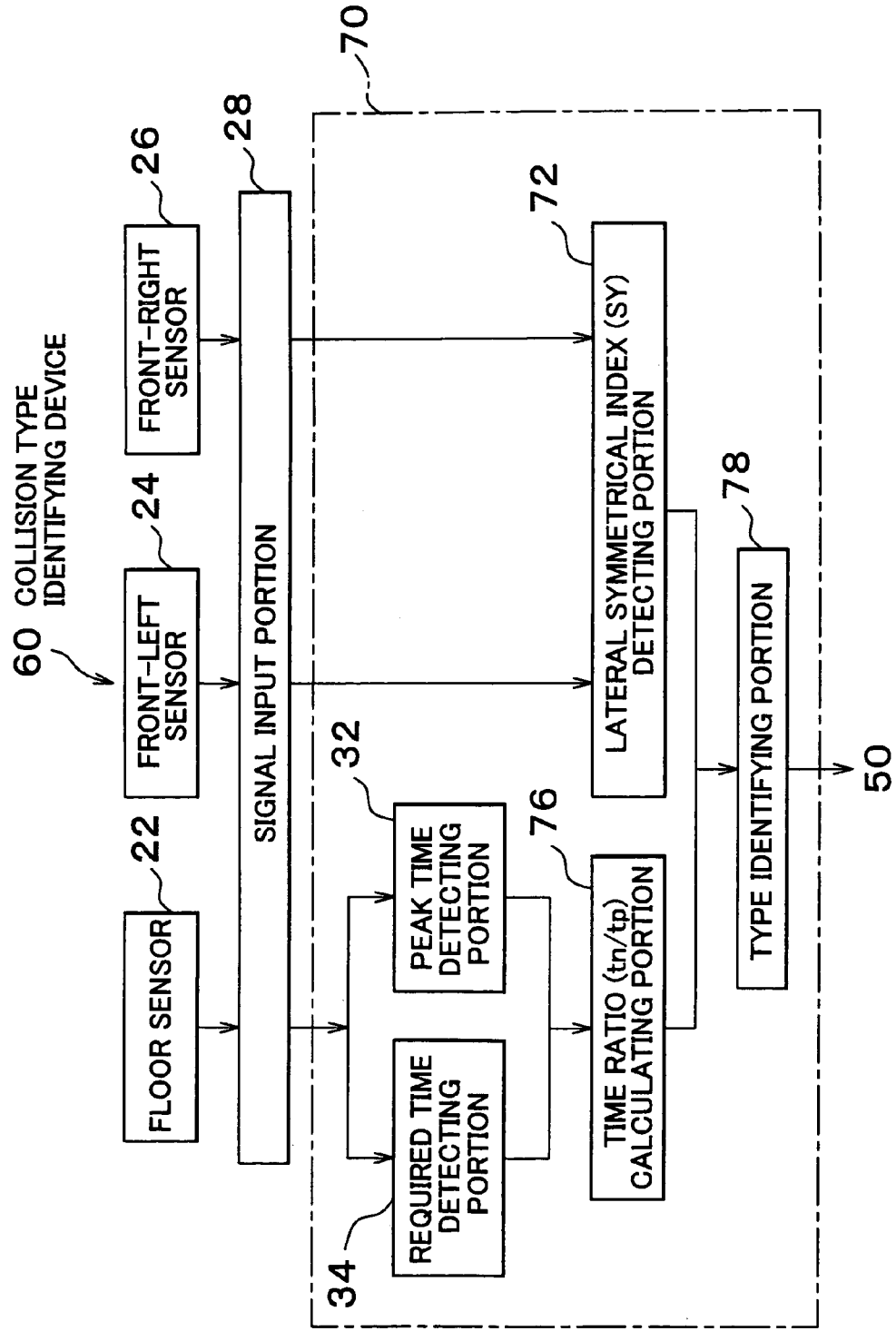
FIG. 13 is a functional block diagram of the overall structure of the collision type identifying device shown in FIG. 11.

Furthermore, the second embodiment of the invention will be described with reference to FIGS. 11 to 16. FIG. 11 shows the hardware structure of a collision type identifying device 60 according to the second embodiment of the invention. FIG. 12 is an exemplary view showing how the collision type identifying device 60 is installed in the vehicle. FIG. 13 is a functional block diagram of the overall structure of the collision type identifying device 60. These drawings are respectively similar to FIGS. 2 to 4, which show the first embodiment of the invention.

The second embodiment handles the collision type identifying device 60 that identifies a vehicle collision type using second vehicle decelerations in addition to the floor G detected by the floor sensor 22. The second vehicle decelerations are a left-side vehicle deceleration (front LG) detected in front of and to the left of the floor G and a right-side vehicle deceleration (front RG) detected in front of and to the right of the floor G.

It is to be noted herein that the same components as in the structure of the aforementioned first embodiment are denoted by the same reference numerals and that the following description will be focused on the characteristic part of the second embodiment.

The collision type identifying device 60 of the second embodiment is also disposed close to the console in the central portion of the vehicle 10. In addition to the floor sensor 22 for detecting the vehicle deceleration floor G in the longitudinal direction of the vehicle 10, a front-left sensor 24 for detecting a deceleration front LG in the longitudinal direction of the vehicle and a front-right sensor 26 for detecting a deceleration front RG in the longitudinal direction of the vehicle are provided. The front-left sensor 24 and the front-right sensor 26 are installed in front of left and right side members (in a crash zone) respectively. That is, the microcomputer 40 of this embodiment identifies a collision type using the front LG and the front RG in addition to the floor G.

In the second embodiment, deceleration signals output from the front-left and front-right sensors 24, 26 are input to the side of the microcomputer 40 via wires 25, 27 respectively. Accordingly, raw data regarding decelerations detected on the sides of the front-left and front-right sensors 24, 26 and raw data regarding the vehicle decelerations on the side of the floor sensor 22 are processed comprehensively on the side of the microcomputer 40. The comprehensive processing on the side of the microcomputer 40 as mentioned herein is preferred because data can be processed with higher quality in comparison with cases where data processed in advance on the sides of the front-left and front-right sensors 24, 26 are transmitted.

The CPU 42 is so set as to monitor the front LG and the front RG as well as the floor G detected by the floor sensor 22. The CPU 42 realizes a collision type identifying portion 70 that identifies a certain collision as head-on collision, oblique collision, ORB, ODB, or pole collision by means of three vehicle decelerations detected by the floor sensor 22 and the front-left and front-right sensors 24, 26, namely, the floor G, the front LG, and the front RG. The functional block diagram of the collision type identifying device 60 shown in FIG. 13 clarifies the structure of the CPU 42.

Referring to FIG. 13, the floor G, the front LG, and the front RG, which are detected periodically, are supplied to the collision type identifying portion 70 via the signal input portion 28. The collision type identifying portion 70 includes the peak time detecting portion 32 and the required time detecting portion 34. The peak time detecting portion 32 detects the first peak time tp in the floor G waveform. The required time detecting portion 34 detects, as the required time tn, a time when the integrated deceleration VG obtained by time quadrature of the floor G becomes equal to a required integrated value.

In the collision type identifying device 70 shown in FIG. 13 as well, the basic processing of the waveform of the floor G detected by the floor sensor 22 is the same as in the case of the first embodiment. The peak time detecting portion 32 and the required time detecting portion 34 detect the first peak time tp and the required time tn respectively.

In this embodiment, the first peak time tp and the required time tn are supplied to a time ratio calculating portion 76, which calculates a time ratio (tn/tp). The time ratio (tn/tp) thus calculated is used for identification by a type identifying portion 78. The time ratio (tn/tp) can be regarded as a guideline indicating a collision state in which deformation occurs to the extent of absorbing an impact caused in the event of a collision of the vehicle 10.

That is, impact-absorbing deformation does not occur in the case where the vehicle 10 collides against a rigid object, namely, in the case of a head-on or ORB collision. In this case, the difference between the first peak time tp and the required time tn is small, as a result, the time ratio (tn/tp) is small. On the contrary, in the case of a pole collision, the center of the vehicle front portion is deformed while absorbing an impact until the collision extends to a rigid member such as an engine. Further, in the case of an ODB collision, a collision object is deformed. As a result, the required time tn is larger and the time ratio (tn/tp) is larger in comparison with the case of the head-on collision or the like. Accordingly, it is effective to use the aforementioned time ratio (tn/tp) as a guideline for identifying a collision type.

Furthermore, the collision type identifying portion 70 of this embodiment has a lateral symmetrical index detecting portion 72 as a processing portion that calculates a lateral symmetrical index SY of a collision by means of the front LG and the front RG.

Figure 14:
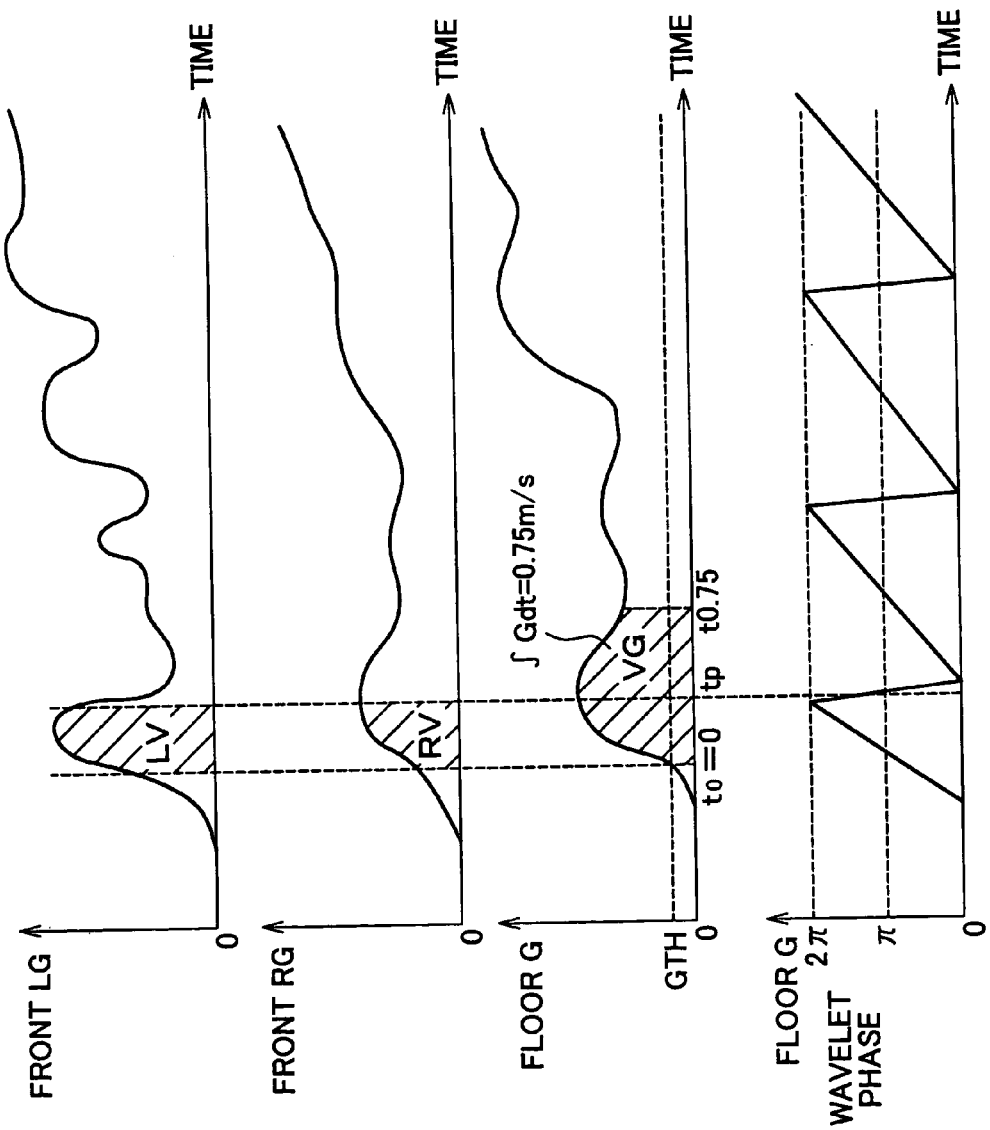
FIG. 14 shows examples of front LG and front RG waveforms together with a front G waveform that is detected by a floor sensor periodically.

FIG. 14 corresponds to FIG. 5 showing the first embodiment. FIG. 14 shows exemplary waveforms of the front LG and the front RG as well as the waveform of the floor G that is detected by the floor sensor 22 periodically. The uppermost stage (first stage) of FIG. 14 shows the front LG waveform. The second stage of FIG. 14 shows the front RG waveform. As in the case of FIG. 5, the two lower stages of FIG. 14 show the floor G waveform and a Wavelet phase obtained by subjecting the floor G waveform to Wavelet transformation.

In this embodiment, attention is paid to the fact that the ratio between a left-side integrated deceleration LV of the front LG (first stage) and a right-side integrated deceleration RV of the front RG (second stage) reflects the lateral symmetrical index of a collision accurately as shown in FIG. 14. This embodiment adds this fact as a requisite for identifying a collision type. It is to be noted herein that these integrated values are used to suppress the noise effect.

For example, as shown in FIG. 14, the left-side integrated deceleration LV of the front LG is much larger than the right-side integrated deceleration RV of the front RG. This makes it possible to predict that an asymmetric collision has occurred and that the vehicle has collided on its left side.

The lateral symmetrical index detecting portion 72 integrates the front LG and the front RG from a time corresponding to the excess of the aforementioned predetermined threshold GTH by the floor G to a time corresponding to the detection of the first peak of the floor G waveform, that is, to the first peak time tp, or integrates the front LG and the front RG for a predetermined time set in advance from the time corresponding to the excess of the threshold GTH by the floor G. Thus, the lateral symmetrical index detecting portion 72 calculates the left-side integrated deceleration LV and the right-side integrated deceleration RV. The lateral symmetrical index detecting portion 72 then detects a ratio between the left-side integrated deceleration LV and the right-side integrated deceleration RV as the lateral symmetrical index SY and supplies it to the type identifying portion 78. In calculating the lateral symmetrical index SY (0 to 1.0), the lateral symmetrical index detecting portion 72 defines that the denominator is the larger one of the left-side integrated deceleration LV and the right-side integrated deceleration RV. In the case of a collision with a high symmetrical index, namely, a head-on or pole collision, the lateral symmetrical index SY is close to 1.0. On the contrary, in the case of a collision with a high asymmetrical index, namely, an oblique collision, the lateral symmetrical index SY is close to 0. The symmetrical index for ORB or ODB is between the symmetrical index for head-on collision or the like and the symmetrical index for oblique collision. It is thus understood that the lateral symmetrical index SY is also an effective guideline for identifying a vehicle collision type.

That is, the second embodiment is designed to identify a vehicle collision type more reliably and more easily by taking both factors, namely, an absorption state of an impact caused during a collision and the lateral symmetrical index SY based on the integrated decelerations LV, RV into account by using the time ratio (tn/tp).

Figure 15:
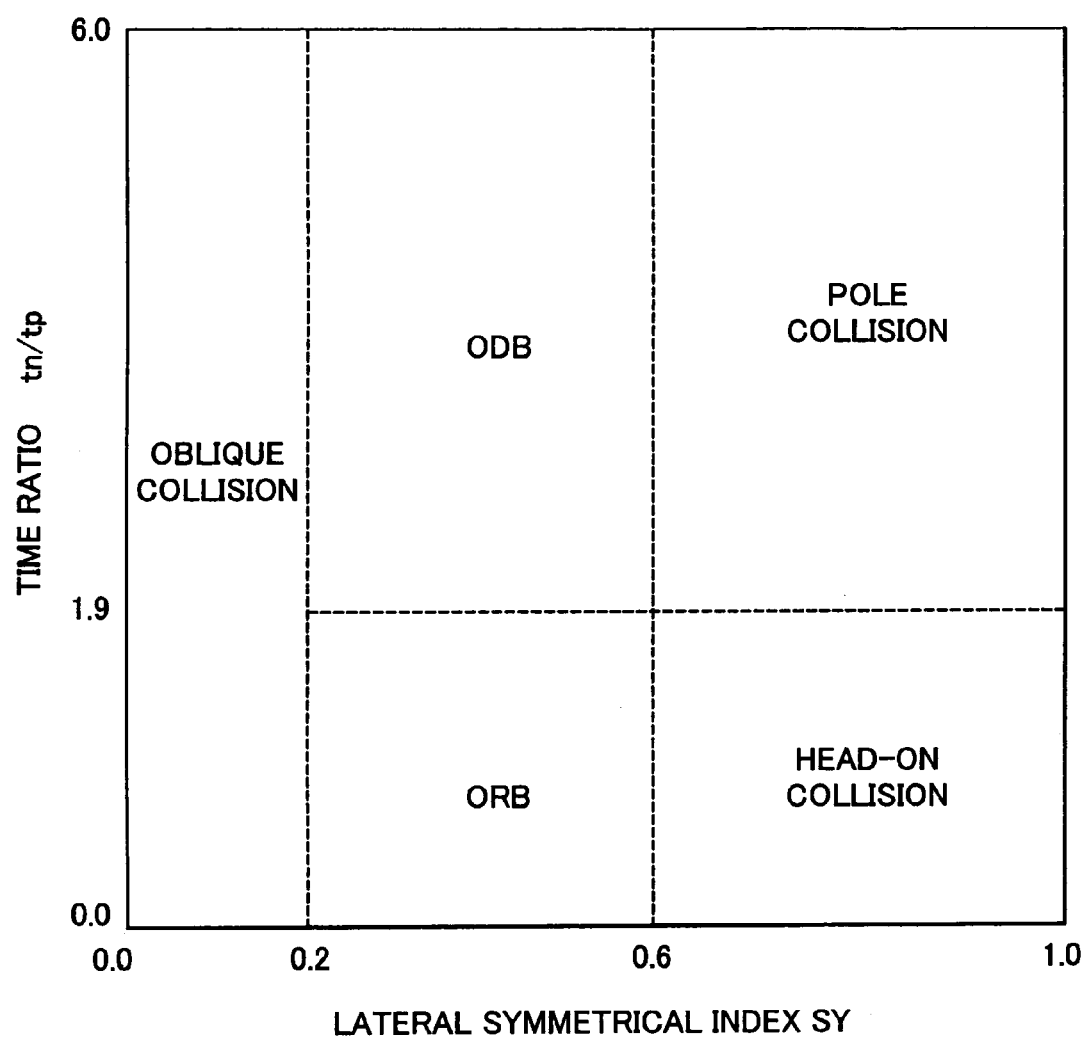
FIG. 15 is an exemplary view of a type identifying map employed in a type identifying portion according to the second embodiment of the invention.

FIG. 15 is an exemplary view of a type identifying map employed in the type identifying portion 78 of the second embodiment. The type identifying map is formed of the aforementioned time ratio (tn/tp) and the aforementioned lateral symmetrical index SY. In this type identifying map as well, identification areas for prediction of respective collision types are set. A collision type can be identified easily by confirming to which one of the identification areas a point that is specified through determination of the time ratio (tn/tp) and the lateral symmetrical index SY belongs. It is to be noted herein that the type identifying map of the second embodiment is also stored in advance in the ROM 44 or the like in the microcomputer 40.

It is to be noted herein that the aforementioned time ratio (tn/tp) can be regarded as indicating crushability. On the contrary, the time ratio (tp/tn) can be regarded as indicating rigidity. Accordingly, the identification of a collision type can be performed in the same manner by using the time ratio (tp/tn) as well.

Figure 16:
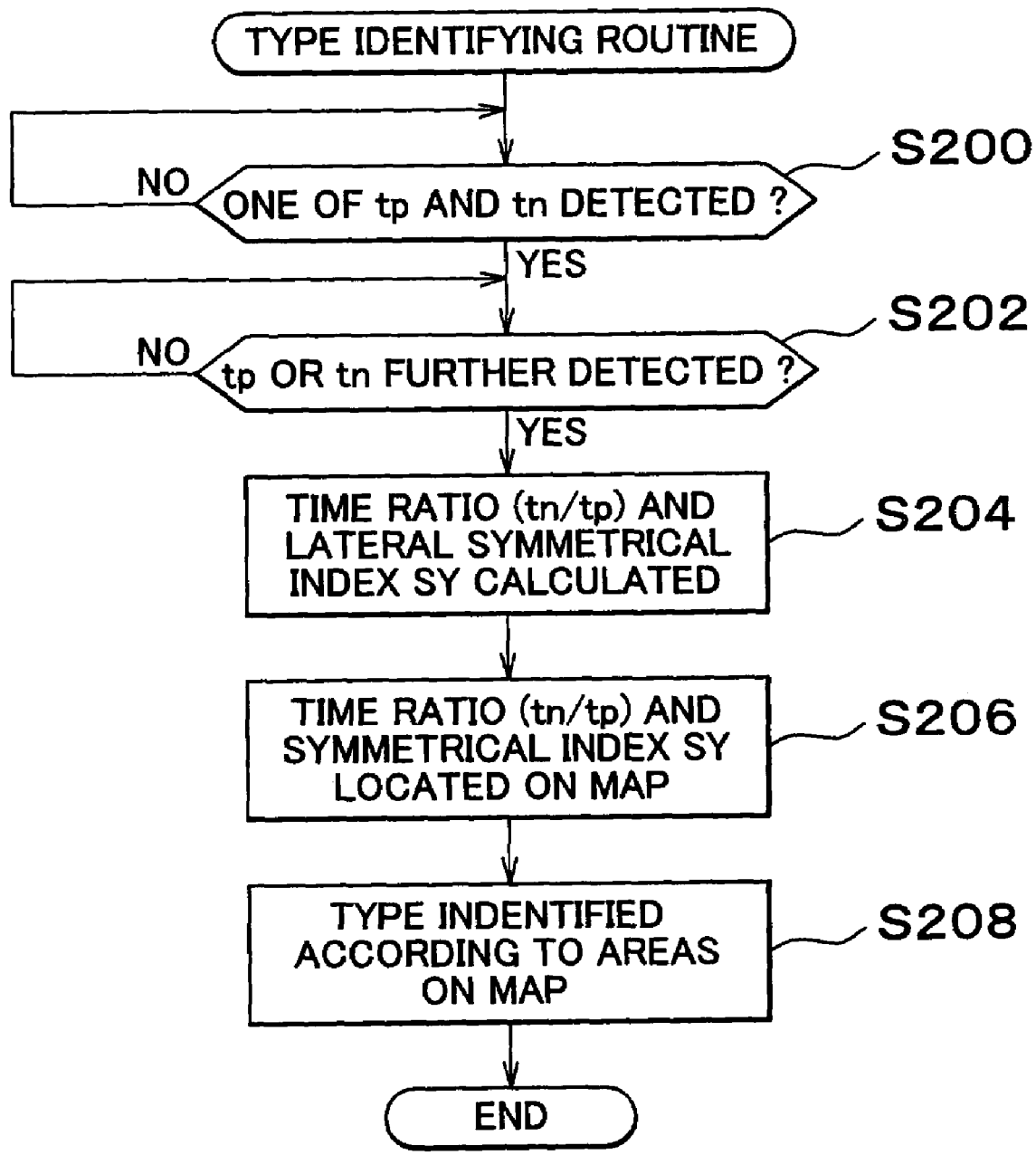
FIG. 16 shows an exemplary identification routine that is executed by the type identifying portion of the collision type identifying device according to the second embodiment of the invention.

FIG. 16 shows an exemplary identification routine that is executed by the type identifying portion 78 realized by the CPU 42 of the collision type identifying device 60.

In FIG. 16, if one of the first peak time tp and the required time tn is detected, the type identifying portion 78 prepares for the identification of a collision type (S200). Furthermore, if the remaining one of the first peak time tp and the required time tn is detected (S202), the type identification processing is performed using the type identifying map.

In step S204, the time ratio calculating portion 76 calculates the time ratio (tn/tp) from the required time tn and the first peak time tp detected. Further, in step S204, the lateral symmetrical index detecting portion 72 detects the lateral symmetrical index SY on the basis of the left-side integrated deceleration LV and the right-side integrated deceleration RV. In step S206, a specific point determined by the time ratio (tn/tp) and the lateral symmetrical index SY is then located on the type identifying map. By subsequently confirming to which one of the identification areas set in advance according to the collision type the specific point belongs, a collision type is identified (S208). The processings of the present routine are then terminated.

A result obtained from the type identification based on the present routine is also used to perform activation control of the passenger protection system 50 shown in FIG. 2.

As described above, the collision type identifying device 60 of the second embodiment can identify a collision of the vehicle 10 as one of a plurality of collision types at once by using the time ratio (tn/tp) between the first peak time tp and the required time tn determined by the floor G waveform and the lateral symmetrical index SY determined on the basis of the front LG and the front RG. In particular, since this embodiment is designed to perform identification in consideration of the lateral symmetrical index determined by the front LG and the front RG detected by the front-left and front-right sensors as well, it is possible to identify a collision type with higher precision. If the collision type identifying device 60 of this embodiment is applied to a passenger protection system such as an air bag system, passengers can be protected effectively.

A collision type identifying device is disposed in a central portion of a vehicle main body and has first deceleration detecting means (22), peak time detecting means (32), required time detecting means (34), and type identifying means (36). The deceleration detecting means (22) detects a vehicle deceleration in the longitudinal direction. The peak time detecting means (32) detects, as a first peak time (tp), a time from the excess of a preset threshold (GTH) by a waveform of the vehicle deceleration (G) detected by the deceleration detecting means (22) to a first peak. The required time detecting means (34) detects, as a required time (tn), a time when an integrated deceleration (VG) obtained through time quadrature of the vehicle deceleration (G) becomes equal to a predetermined integrated value set in advance. The type identifying means (36; 78) identifies a vehicle collision type on the basis of the first peak time (tp) and the required time (tn). The collision type identifying device can identify a vehicle collision as one of a plurality of collision types at once.

While the invention has been described with reference to the exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A collision type identifying device disposed in a central portion of a vehicle main body, comprising:
    a first deceleration detector that detects a vehicle deceleration in the longitudinal direction;
    a peak time detector that detects, as a first peak time, a time from the excess of a preset threshold by a waveform of the vehicle deceleration detected by the first deceleration detector to a first peak;
    a required time detector that detects, as a required time, a time when an integrated deceleration obtained through time quadrature of the vehicle deceleration becomes equal to a predetermined integrated value; and
    a type identifying device that identifies a vehicle collision type on the basis of a collision type identifying map which is formed of the first peak time and the required time.

2. The collision type identifying device according to claim 1, further comprising:
    a second deceleration detector that is disposed in front of and to the left and right of the first deceleration detector and that detects vehicle decelerations in the longitudinal direction of the vehicle as left-side and right-side decelerations;
    a time ratio calculating device that calculates a time ratio between the first peak time and the required time; and
    a symmetrical index detector that detects a lateral symmetrical index in the event of a vehicle collision on the basis of the left-side deceleration and the right-side deceleration; wherein said type identifying device identifies a vehicle collision type on the basis of the time ratio and the lateral symmetrical index.

3. The collision type identifying device according to claim 2, wherein said symmetrical index detector has a function of calculating a left-side integrated deceleration and a right-side integrated deceleration through time quadrature of the left-side deceleration and the right-side deceleration respectively and detects the lateral symmetrical index in the event of a vehicle collision on the basis of the left-side integrated deceleration and the right-side integrated deceleration.

4. The collision type identifying device according to claim 3, wherein said symmetrical index detector detects the lateral symmetrical index on the basis of a lateral ratio between the left-side integrated deceleration and the right-side integrated deceleration, which are obtained through integration for a predetermined time set in advance after the first peak time or the threshold has been exceeded.

5. The collision type identifying device according to claim 2, wherein said type identifying device has said collision type identifying map which is formed of the time ratio and the lateral symmetrical index and on which a plurality of identification areas are set, and identifies a vehicle collision type by confirming to which one of the identification areas a specific point determined at the time of detection of the time ratio and the lateral symmetrical index belongs.

6. The collision type identifying device according to claim 1, wherein said predetermined integrated value is set in advance as a predetermined integrated deceleration corresponding to the required time, which is a critical value for determining whether to activate a passenger protection system in the event of a collision of the vehicle.

7. The collision type identifying device according to claim 1, wherein said required time detector has a function of calculating an integrated deceleration through time quadrature of the vehicle deceleration and is so set as to start calculating the integrated deceleration upon the excess of the threshold by the vehicle deceleration and to detect the required time when the integrated deceleration becomes equal to the predetermined integrated value.

8. The collision type identifying device according to claim 1, wherein said peak time detector confirms the first peak on the basis of an event in which a Wavelet phase obtained by subjecting the waveform of the vehicle deceleration to a Wavelet transformation processing is first inverted from $2\pi$ to 0, and detects the first peak time.

9. The collision type identifying device according to claim 1, wherein on said collision type identifying map a plurality of identification areas are set and said type identifying device identifies a vehicle collision type by confirming to which one of the identification areas a specific point determined at the time of detection of the first peak time and the required time belongs.

10. The collision type identifying device according to claim 1, wherein said predetermined integrated value is 0.7 to 0.8 m/s.

* * * * *

UNITED STATES PATENT AND TRADEMARK OFFICE
CERTIFICATE OF CORRECTION

PATENT NO.       : 7,031,815 B2
APPLICATION NO. : 10/488000
DATED            : April 18, 2006
INVENTOR(S)      : Katsuji Imai et al.

It is certified that error appears in the above-identified patent and that said Letters Patent is hereby corrected as shown below:

COLUMN      LINE

8      5      Charge " $\Omega_o$ " to -- $\omega_b$ --.

Signed and Sealed this

Twenty-second Day of August, 2006

JON W. DUDAS
*Director of the United States Patent and Trademark Office*